United States Patent
Fitch et al.

(10) Patent No.: US 11,429,165 B1
(45) Date of Patent: Aug. 30, 2022

(54) SYSTEM AND METHOD FOR DETECTING OILY RESIDUE IN TWO-PHASE IMMERSION COOLING SYSTEMS

(71) Applicant: Dell Products L.P., Round Rock, TX (US)

(72) Inventors: Jon Taylor Fitch, Austin, TX (US); Steven Embleton, Austin, TX (US); David Lyle Moss, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 17/168,595

(22) Filed: Feb. 5, 2021

(51) Int. Cl.
   *G06F 1/20* (2006.01)

(52) U.S. Cl.
   CPC ................... *G06F 1/206* (2013.01)

(58) Field of Classification Search
   CPC ............... G06F 1/206; G06F 11/3058
   See application file for complete search history.

(56) References Cited

U.S. PATENT DOCUMENTS

| | | | |
|---|---|---|---|
| 7,362,448 B1 | 4/2008 | Liu et al. | |
| 9,921,622 B2 * | 3/2018 | Shelnutt | H05K 7/20818 |
| 2007/0259256 A1 * | 11/2007 | Le Canut | H01M 8/04835 |
| | | | 320/134 |
| 2009/0260777 A1 * | 10/2009 | Attlesey | H01L 23/473 |
| | | | 165/104.33 |
| 2014/0218858 A1 * | 8/2014 | Shelnutt | H05K 7/203 |
| | | | 361/679.31 |
| 2018/0288906 A1 * | 10/2018 | Hopton | H05K 7/203 |
| 2020/0001513 A1 | 1/2020 | Jones et al. | |
| 2020/0093026 A1 * | 3/2020 | Enright | B25J 9/026 |
| 2021/0102294 A1 * | 4/2021 | Miljkovic | C23C 14/205 |

(Continued)

FOREIGN PATENT DOCUMENTS

| | | |
|---|---|---|
| JP | 2003247812 | 9/2003 |
| KR | 2014/0140039 | 12/2014 |
| WO | 9915881 | 4/1999 |

(Continued)

OTHER PUBLICATIONS

P. E. Tuma, "Design considerations relating to non-thermal aspects of passive 2-phase immersion cooling," *2011 27th Annual IEEE Semiconductor Thermal Measurement and Management Symposium*, San Jose, CA, 2011, pp. 1-9.

(Continued)

*Primary Examiner* — Chun Cao
(74) *Attorney, Agent, or Firm* — Baker Botts, L.L.P.

(57) ABSTRACT

A system for detecting residue in a two-phase immersion cooling system based on contact resistance. A structure is formed to represent a type of connection between a component and a connector. The structure is positioned near a heat source in the two phase fluid in its liquid state. As the fluid boils, residues are deposited on the structure. An increase in the current resistance across the structure may indicate the presence of a residue or corrosion caused by the residue. Structures may be formed using materials that are similar to existing connections in the information handling system. A heating element may generate more heat than existing components such that the system detects the presence of contaminants with sufficient time to allow less expensive and less intensive corrective measures.

18 Claims, 4 Drawing Sheets

(56) References Cited

U.S. PATENT DOCUMENTS

2021/0219455 A1* 7/2021 Lau .................. H05K 7/203

FOREIGN PATENT DOCUMENTS

| WO | 2009/022649 | 11/2010 |
|---|---|---|
| WO | 2015/074669 | 5/2015 |

OTHER PUBLICATIONS

H. Coles, M. Herrlin, Immersion Cooling of Electronics in DoD Installations, Ernest Orlando Berkeley National Laboratory Report LBNL-100566, May 2016.

Husam Alissa, Mark Shaw, Liquid Immersion Optimized Servers, Presentation at Open Compute Forum San Jose CA Mar. 3-4, 2020.

J. Flinn and M. Satyanarayanan. "Energy-aware adaptation for mobile applications." ACM SIGOPS Operating Systems Review, vol. 34, No. 2, pp. 13-14, 2000.

J. Aguilar-Saborit, P. Trancoso, V. Muntcs-Mulcro and J.L. Larriba-Pcy. "Dynamic adaptive data structures for monitoring data streams." Data & Knowledge Engineering, ScienceDirect, vol. 66, pp. 92-115, Mar. 2008.

Shehabi, S. J. Smith, E. Masanet, J. Koomey, Environ. Res. Lett. 13, 124030 (2018). 12. IEA, "Tracking clean energy progress" (IEA, 2019); www.iea.org/tcep/.

QTS, "Green Data Centers—Scaling environmental sustainability for business and consumers collectively." https://www.networkworld.com/article/3569189/green-data-centers-scaling-environmental-sustainabihty-for-business-and-consumers-collectively.html, Jul. 30, 2020.

* cited by examiner

SYSTEM AND METHOD FOR DETECTING OILY RESIDUE IN TWO-PHASE IMMERSION COOLING SYSTEMS

BACKGROUND

Field of the Disclosure

This disclosure relates generally to immersion cooling and, more particularly, to systems for detecting oily residue in two-phase immersion cooling systems for information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments disclosed herein may be directed to systems for detecting oily residue and other contaminants in a two-phase immersion cooling system.

Some immersion cooling systems use two-phase fluids to directly remove heat from components. Heat causes the immersion fluid to change from a first phase (the liquid phase) to a second phase (the vapor phase), wherein the boiling point of the fluid is selected to maintain a component temperature at or below a threshold temperature. In some systems, component surfaces may be etched, have a boiling enhancement coating (BEC) or otherwise be configured to have increased surface area for improved heat transfer to the two-phase fluid.

Embodiments disclosed herein may be generally directed to detecting contact resistance to identify residue on component surfaces in two-phase immersion cooling systems and provide a signal or otherwise communicate that presence of a residue.

Embodiments may be directed to a system for detecting residue in an immersion cooling system. The system may include a structure configured to represent a type of contact point in an information handling system installed in the immersion cooling system, a current source for applying a current through the structure, a heat source proximate to the structure, a sensor for outputting a signal corresponding to the current passing through the structure, and a processor coupled to the sensor. The heat source may be configured to heat a two-phase fluid to a boiling point. The processor may be configured to receive the signal from the sensor, determine an increase in a contact resistance based on the signal indicating a decrease in the current passing through the structure, and communicate an indication that a residue in the two-phase fluid has exceeded a threshold level based on the increase in the contact resistance.

In some embodiments, the system is a stand-alone system comprising a heating card comprising a first plurality of pins and a heating element, and a sensor card for coupling to the heating card. The sensor card may include the sensor and a plurality of pin receivers for connecting to the first plurality of pins on the heating card, wherein the structure comprises a plurality of contact points between the first plurality of pins and the plurality of pin receivers. The system may include a multiplexer coupled to the plurality of pin receivers and coupled to a second plurality of pins less than the first plurality of pins, wherein the second plurality of pins are configured for coupling to the connector in the information handling system.

In some embodiments, the system comprises a bridge between at least two pin receivers of the plurality of pin receivers to form a contact chain. In some embodiments, a contact resistance associated with the contact chain is more sensitive to the change in current resistance than any pin of the first plurality of pins. In some embodiments, the heating element is configured to cause more boiling per unit of area than the component.

In some embodiments, the second plurality of pins is configured for coupling to a PCIe card.

In some embodiments, the structure is integrated with the connector or the component. In some embodiments, the structure connects at least two pin receivers of the plurality of pin receivers to form a contact chain. In some embodiments, a contact resistance associated with the contact chain is more sensitive to the change in current resistance than any pin of the first plurality of pins.

In some embodiments, the structure comprises a multiple terminal resistance structure. In some embodiments, the structure comprises a Kelvin structure.

Embodiments may be directed to a two-phase immersion cooling system comprising a tank containing a two-phase fluid, a printed circuit board (PCB) comprising a heat generating component installed in the tank, and a system for detecting residue in the two-phase fluid. The system for detecting residue may include a structure configured to represent a type of contact point between a component and a connector in an information handling system installed in the immersion cooling system, a current source for applying a current through the structure, a heat source proximate to the structure, a sensor for outputting a signal corresponding to the current passing through the structure, and a processor coupled to the sensor. The heat source may be configured to heat the two-phase fluid to a boiling point. The processor may be configured to receive the signal from the sensor, determine an increase in a contact resistance based on the signal indicating a decrease in the current passing through the structure, and communicate an indication that a residue in the two-phase fluid has exceeded a threshold level based on the increase in the contact resistance.

In some embodiments, the system for detecting residue in the two-phase fluid is a stand-alone system comprising a heating card comprising a first plurality of pins and a heating element, wherein the heating element is the heat source, and a sensor card for coupling to the heating card. In some embodiments, the sensor card comprises the sensor, a plurality of pin receivers for connecting to the first plurality of pins on the heating card to form a plurality of contact points, and a multiplexer coupled to the plurality of pin receivers and coupled to a second plurality of pins less than the first plurality of pins, wherein the second plurality of pins are configured for coupling to the connector in the information handling system.

In some embodiments, a bridge is formed between at least two pin receivers of the plurality of pin receivers to form a contact chain. In some embodiments, a contact resistance associated with the contact chain is more sensitive to the change in current resistance than any pin of the first plurality of pins.

In some embodiments, the printed circuit board comprises a PCIe card.

In some embodiments, the structure is integrated with the connector or the component. In some embodiments, the structure connects at least two contact points of the plurality of contact points to form a contact chain. In some embodiments, a contact resistance associated with the contact chain is more sensitive to the change in current resistance than any pin of the first plurality of pins.

In some embodiments, the structure comprises a multiple terminal resistance structure.

BRIEF DESCRIPTION OF THE DRAWINGS

For a more complete understanding of the invention and its features and advantages, reference is now made to the following description, taken in conjunction with the accompanying drawings, in which.

Figure 1:
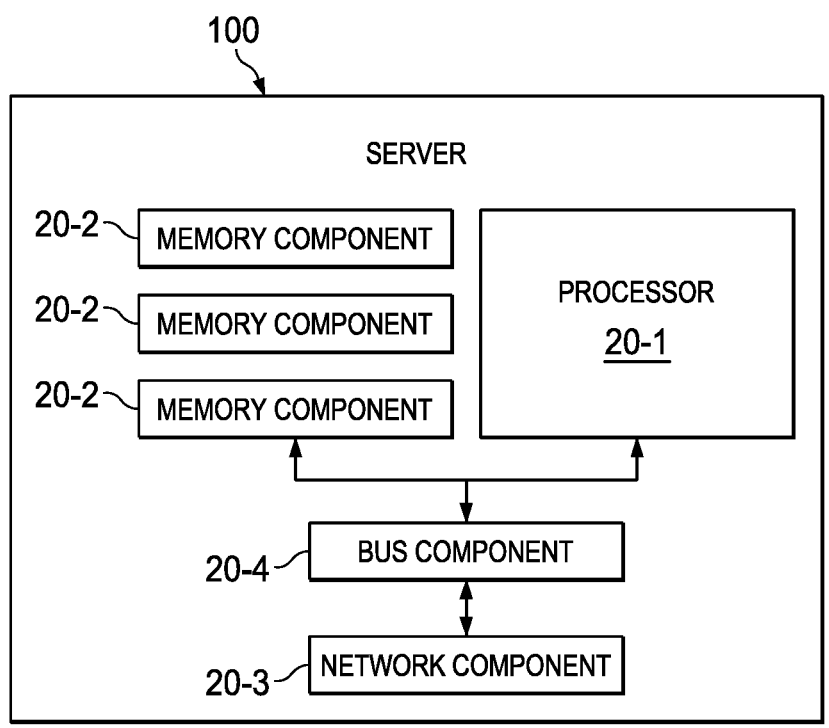
FIG. 1 is a block diagram of selected components of an information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, component "20-1" refers to an instance of a component, which may be referred to collectively as components "20" and any one of which may be referred to generically as component "20."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices and one or more communications ports for communicating with external devices. The information handling system may also include one or more buses operable to transmit communication between the various hardware components.

Embodiments disclosed herein are described with respect to immersion cooling systems configured for direct cooling of heat-generating components on information handling systems installed in tanks containing two-phase fluids. Particular embodiments are best understood by reference to FIGS. 1-3 and 4A-4C, wherein like numbers are used to indicate like and corresponding parts.

Referring to FIG. 1, an information handling system such as information handling system 100 may include processor components 20-1, memory components 20-2 and network components 20-3, along with bus components 20-4 or other systems for connecting components 20 on information handling system 100.

Processor components 20-1 may comprise systems, devices, or apparatuses operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor components 20-1 may interpret and execute program instructions and process data stored locally (e.g., in memory subsystem). In the same or alternative embodiments, processor components 20-1 may interpret and execute program instructions and process data stored remotely (e.g., in a network storage resource).

Memory components 20-2 may comprise systems, devices, or apparatuses operable to retain and retrieve program instructions and data for a period of time (e.g., computer-readable media). Memory components 20-2 may comprise random access memory (RAM), electrically erasable programmable read-only memory (EEPROM), a PCM-CIA card, flash memory, magnetic storage, opto-magnetic storage, and/or a suitable selection and/or array of volatile or non-volatile memory that retains data after power to its associated information handling system is powered down.

Network components 20-3 may comprise systems, devices, or apparatuses operable to serve as an interface between an information handling system and a network (not shown). Network components 20-3 may enable information handling systems 100 to communicate over a network using a suitable transmission protocol or standard. In some embodiments, a network interface may be communicatively coupled via a network to a network storage resource (not shown). A network coupled to a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to a network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to a network interface or various network components 20-3 associated therewith may be implemented using hardware, software, or any combination thereof.

Bus components 20-4 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Components 20 receive power and communicate with other components 20 on information handling system 100 through electronic connections. As power and communication enters information handling system 100, the connections allow information handling system 100 to execute instructions and process information. Examples of electronic connections include permanent connections such as ball grid arrays (BGAs) and other soldered connections and non-permanent connections such as pin connectors, which allow for easier installation and removal of components 20. Each connection provides a path for power and/or communication between components 20 on information handling system 100. Each connection may involve one or more contact points. In some information handling systems, contact points may be formed at least partially with gold due to the low current resistance of gold and formed at least partially with nickel or some other material to protect the gold or provide a better base for adhering the gold to the component, PCB, etc. Information handling systems 100 can have 10,000 or more contact points including contact points found in Dual In-Line Memory Modules (DIMMs), peripheral component interface express (PCIe) cards, central processing units (CPUs) and other components.

Variations of information handling system 100 are possible. For example, FIG. 1 depicts network components 20-3 as part of information handling system 100 and processor component 20-1 may be the primary component 20 or subsystem being cooled. However, a two-phase immersion cooling system may be useful for cooling large telecom data center switches where the primary system being cooled is a network switch 20-3. Other systems may be a data storage center where the primary system being cooled is a memory component 20-2.

Two-Phase Immersion Cooling System

As components 20 on information handling system 100 execute instructions and process information, they generate heat. One approach to cool components 20 is a two-phase immersion cooling system. In two-phase immersion cooling, one or more information handling systems 100 are immersed in a non-conductive fluid with a low boiling point. Novec 649 is an example of a two-phase fluid. Novec 649 is non-conductive and has a boiling point of 49 C. Information handling systems 100 may be immersed in Novec 649 and the Novec 649 may directly remove heat from components 20.

Figure 2:
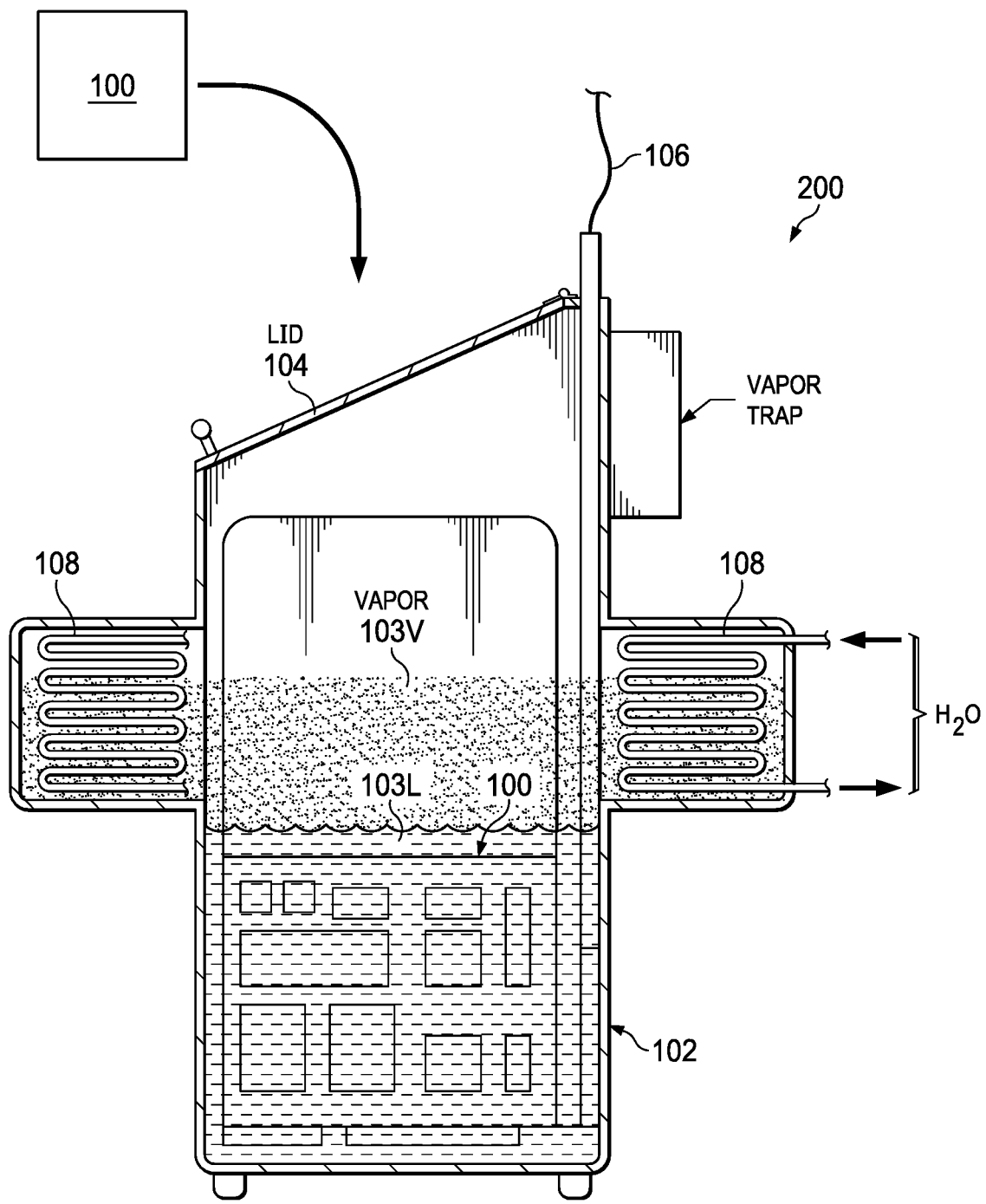
FIG. 2 is a side cutaway view of a two-phase immersion cooling system with the information handling system of FIG. 1 installed therein.

FIG. 2 is side cutaway view of a two-phase immersion cooling system with information handling system 100 installed therein.

As shown in FIG. 2, a two-phase immersion cooling system 200 may include, but is not limited to, tank 102 containing fluid 103 with lid 104, cables 106, heat exchanger 108 and vapor trap 110.

Tank 102 contains two-phase fluid 103 capable of existing in both a liquid phase (denoted as fluid 103L) and as a vapor (denoted as fluid 103V), wherein "fluid 103" comprises a non-conductive fluid with a low boiling point and includes fluid 103L and fluid 103V. Lid 104 allows for installation, removal and servicing of one or more information handling systems 100 in tank 102. When closed, lid 104 seals tank 102 to prevent contaminants from entering fluid 103.

Cables 106 provide power and communication functionality to the components 20 on information handling system 100.

Heat exchanger 108 is configured to remove heat from fluid 103. Contact by fluid 103V with heat exchanger 108 results in condensation, which changes fluid 103V to fluid 103L.

Vapor trap 110 may remove water vapor from tank 102 to prevent contamination of fluid 103.

Components 20 use the power to process instructions and, in the process, generate heat. Using fluid 103 with a low boiling point is effective in removing heat from components 20 and information handling system 100 due to phase transformation of fluid 103 from a liquid phase to a vapor phase and conduction. If components 20 generate enough heat, localized boiling of fluid 103L may occur near a component surface, wherein much of the cooling happens because of the phase transformation. As fluid 103L boils, bubbles of fluid 103V form near component 20 and rise to the surface, which promotes fluid flow past component 20, wherein conduction further cools components 20. Since tank 102 is sealed, fluid 103V may exit fluid 103L but fluid 103V is retained in tank 102. For some heat generating components 20, a component surface may be etched or treated with a boiling enhancement coating (BEC) (not shown) to increase the surface area for increased boiling.

Residues—Overview

Two-phase immersion cooling of components 20 is susceptible to problems if contaminants are present in fluid 103. Contaminants may be introduced into fluid 103 when components 20 or information handling systems 100 are added, serviced or replaced. For example, liquid water can solvate contaminates and become corrosive. Contaminants may collect in certain areas of tank 102 relative to information handling systems 100 due to the two-phase immersion cooling process. For example, when fluid 103V condenses into fluid 103L, fluid 103L in some areas of tank 102 may be highly concentrated or pure, causing plasticizers and other contaminants to leach from printed circuit boards (PCBs), cables, plastic parts and other components of information handling system 100 with negative pressures or diffusion through elastomers. Also, when fluid 103L boils to change into fluid 103V, contaminants in the form of residues are distilled out of fluid 103L at the point where the boiling occurs.

Effects of Residues

Residues caused by distilling contaminants out of fluid 103L may negatively affect heat transfer from components 20. For example, residues may be deposited on a component surface, which can decrease the rate at which heat can be transferred out of the component 20. For components 20 with etched component surfaces or BECs, covering the component surface or filling in the component surface texture with residues will reduce the total surface area of the component surface, further reducing the rate at which heat can be transferred away from component 20. Residues can also lead to corrosion and metal migration, which may result in problems such as fouled contact points and current leakage paths or some other interference between components 20. For example, residues may be deposited on contact points between components 20 and connectors of printed circuit boards (PCB) or other connectors of information handling system 100, providing a catalyst for corrosion. Referring to connections with gold and nickel plating with a copper base metal, the plating has tiny pores that expose the copper base metal to contaminants that corrode the copper. As corrosion advances, the nickel or copper material may corrode through the gold material such that the contact point includes gold, copper and/or nickel. In doing so, the current resistance at the contact point (also referred to as contact resistance) may increase, causing a decrease in performance capability of component 20 up to failure of the component. Furthermore, a negative effect associated with one contaminant may combine with negative effects of other contaminants, leading to a cumulative increase in residue or causing a cascading failure.

An approach to preventing corrosion is to use materials that do not form contaminants. For example, some materials have been identified that are less likely to leach contaminants when in contact with Novec 649. However, not all materials can be replaced. As a result, contaminants are commonly found in fluids 103 when using two-phase immersion cooling.

Another approach to preventing corrosion is to remove the contaminants. Filters are used in an effort to remove contaminants. Activated carbon filters can remove plasticizers that cause oily residues. However, filters might not remove all contaminants and filter capacity can be exceeded if new information handling systems are added to the tank, an information handling system is replaced or parts containing plastic are added or replaced. Consequences of exceeding the filter capacity may require a technician having to dis-assemble and clean the oily residue out of every ball grid array (BGA), DIMM, CPU, GPU etc., in a tank of information handling systems 100. However, cleaning residue out from underneath BGAs and other components 20 is not always possible such that reversal or remediation of residues is not always possible. As a result, residues present in immersion cooling system risk permanently damaging BGAs and contact points or leading to failures in an entire tank 102 of information handling systems 100.

Embodiments disclosed herein may include a system for early detection of oily residue formation to allow for corrective actions before permanent damage to information handling systems 120 or components on information handling systems 120 can occur.

Measuring Changes in Contact Resistance as an Indicator of the Presence of a Residue To overcome these problems and others, embodiments may include a contact resistance monitoring system for detecting residues in two-phase fluids based on changes in contact resistance. In some embodiments, current resistance at contact points ("contact resistance") is measured and analyzed. An increase of contact resistance may indicate the presence of oily residue associated with the formation of corrosion between contact points. As contact resistance increases, embodiments may determine this as an indicator that residue is present in fluid 103 at a level sufficient to cause corrosion, decrease heat transfer rate or result in other unwanted effects.

Contact Resistance Monitoring Systems—Overview

Referring to one or more of FIGS. 3 and 4A-4C, embodiments of a contact resistance monitoring system may monitor current resistance across a structure configured to represent a type of contact point for a component 20 on information handling system 100. In some embodiments, a contact resistance monitoring system may comprise multiple structures, with each structure configured to represent one type of contact point for a component 20 on information handling system 100. To increase the sensitivity of the contact resistance monitoring system, embodiments may include a bridge between contact points to form a contact chain. To increase the likelihood that contact resistance monitoring system can detect residue early, embodiments may be positioned near a heat source or include a heating element. The heat source may be selected due to a high rate of heat generation, or a heating element may be configured to generate more heat than any heat generating component 20 to maximize the rate at which fluid 103 boils in the vicinity of the contact resistance monitoring system. Embodiments may also include a multiplexer (MUX) configured to scan current through multiple contacts or chains.

Contact Resistance Monitoring Systems—Stand Alone

Figure 3:
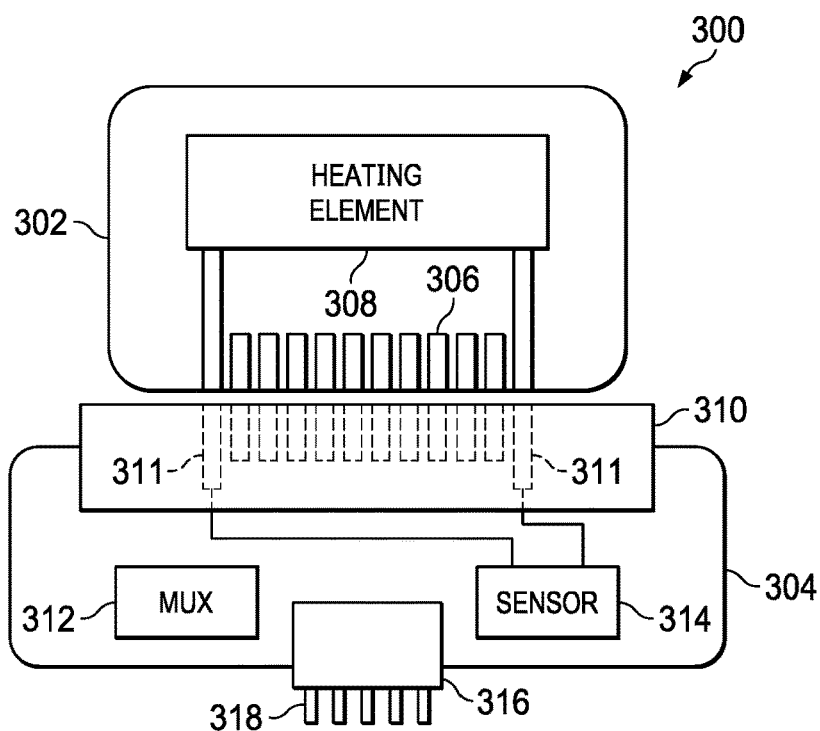
FIG. 3 is a side view of one embodiment of a stand-alone contact resistance monitoring system for detecting residue in fluid contained in the two-phase immersion cooling system of FIG. 2.

Referring to FIG. 3, embodiments of a contact resistance monitoring system may comprise a stand-alone contact resistance monitoring system 300 comprising heating card 302 and sensor card 304.

Heating card 302 may be formed with a first plurality of pins 306 and heating element 308. The plurality of pins 306 may represent contact points in a pin connection. The number of pins 306 on heating card 302 may be the same, fewer or more than a number of pins in an existing connection between a component 20 on information handling system 100. For example, the number of pins 306 may be more, less or the same number as the number of pins on a DIMM. Heating element 308 may be configurable to heat fluid 103L to a temperature to cause fluid 103L to boil near pins 306 such that contaminants are distilled out of fluid 103 in the vicinity of pins 306. In some embodiments, heating element 308 may be configured to generate more heat than any component 20 on information handling system 100 such that a residue has a higher probability of being deposited on contact resistance monitoring system 300 than any component 20 on information handling system 100.

Sensor card 304 may be configured with connector 310 with pin receivers 311 for connecting to the plurality of pins 306 on heating card 302, wherein pins 306 and pin receivers 311 form a structure representing a type of contact point such as a DIMM installed in a slot. Sensor card 304 may contain multiplexer (MUX) 312 for reducing the number of pins 306 to minimize the amount of power needed for heating element 308 to boil fluid 103L. Current resistance sensor 314 may measure resistance in sensor card 304 based on Ohm's law. Measuring resistance may involve forcing a fixed current and measuring a voltage drop or forcing a voltage and measuring a change in current. In some embodiments, a current is forced through connector 310 and contact resistance monitoring system 300 may analyze the voltage drop across connector 310 and determine if a contact resistance is increasing. In some embodiments, a voltage is applied to connector 310 and contact resistance monitoring system 300 may analyze the current passing through connector 310 and determine if a contact resistance is increasing. In some embodiments, current resistance sensor 314 may detect the current that passes through connector 310 and contact resistance monitoring system 300 may communicate the information to a processor component 20-1 to analyze the current passing through connector 310.

In some embodiments, contact resistance monitoring system 300 may be connected to a peripheral component interface (PCI) card, which may allow contact resistance monitoring system 300 to utilize heat from nearby components 20 instead of generating all the heat needed to boil fluid 103L. In other embodiments, contact resistance monitoring system 300 may be positioned away from other components 20, including positioned away from information handling system 100, which may require contact resistance monitoring system 300 to generate more heat to boil fluid 103L but minimize the possibility that contact resistance monitoring system 300 increase the presence of residue near components 20.

Contact Resistance Monitoring Systems—Integrated

In some immersion cooling systems, embodiments of stand-alone contact resistance monitoring system 300 may be undesirable or impractical. For example, heating element 308 requires extra power and generates extra heat in two-phase fluid 103L in tank 102, which could put additional working requirements of heat exchanger 108 or put additional stress on two-phase fluid 103. Also, tank 102 may have limited volume due to multiple information handling systems 100. To avoid these possible obstacles, some embodiments of a contact resistance monitoring system may be integrated with information handling system 100 or a component 20 on information handling system 100.

Figure 4A:
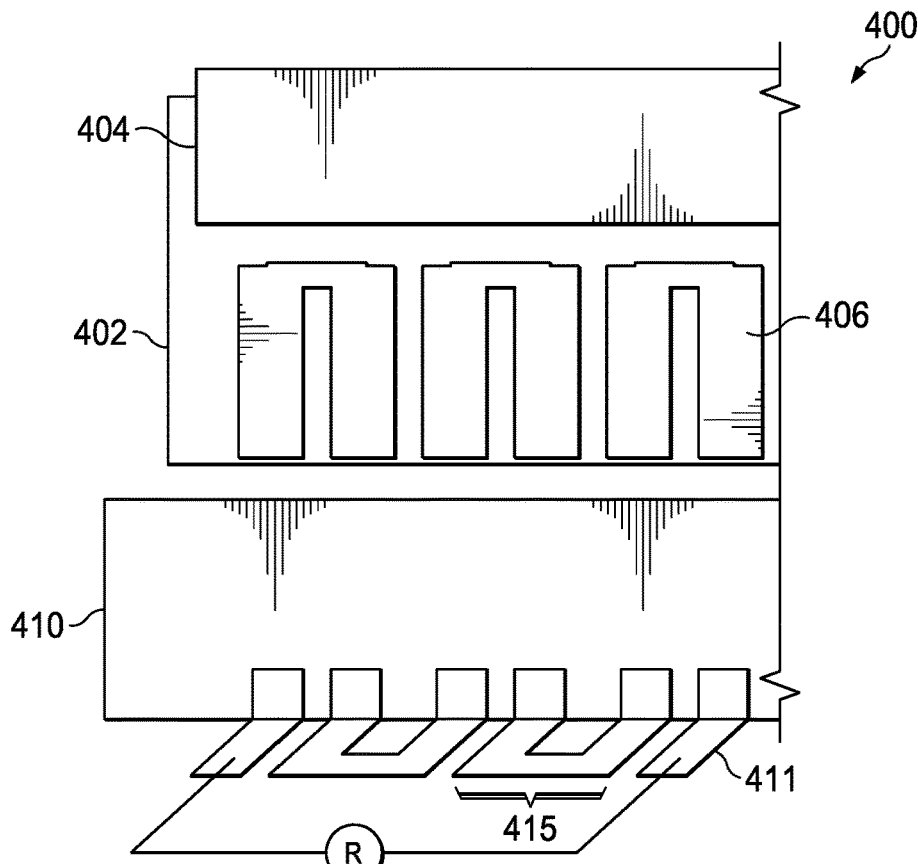
FIGS. 4A-4C are perspective, front and side views of one embodiment of a DIMM module configured for use with a contact resistance monitoring system in a two-phase immersion cooling system.
Figure 4B:
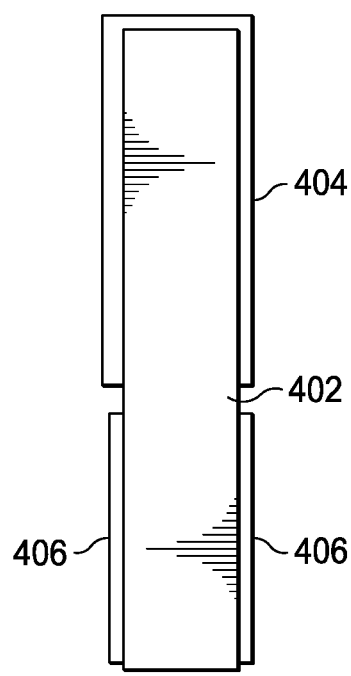
Figure 4C:
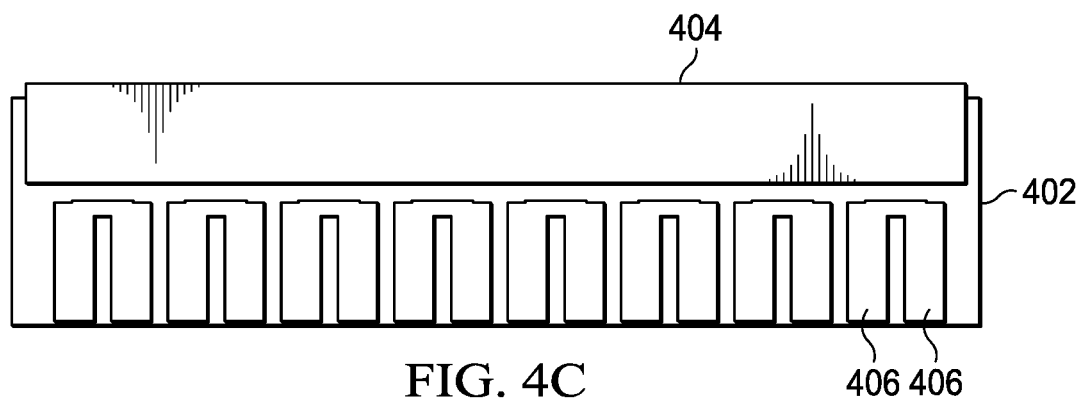

FIGS. 4A-4C depict embodiments of contact resistance monitoring system 400 relative to a Dual In-Line Memory Module (MINIM) as an exemplary memory component 20-2. Similar contact chaining can be implemented on other components 20 such as peripheral component interface (PCI) cards 20-4 and CPUs 20-1, for example.

Referring to FIGS. 4A-4C, embodiments may be integrated with an existing connection of a component 20 such as Dual In-Line Memory Module (DIMM) 402. DIMM 402 may have a plurality of pins 406 for contact with pin receivers 411 in connector 410 to form a structure for monitoring changes in contact resistance. DIMM 402 may generate heat at a rate too low to boil enough fluid 103L to enable early detection of residue, but DIMM 402 is still susceptible to the effects of residues. As depicted in FIGS. 4A-4C, contact resistance monitoring system 400 may comprise DIMM 402 having heater 404 installed thereon to ensure boiling occurs near DIMM 402.

Contact Chains to Increase Sensitivity

Still referring to FIG. 4A, in some embodiments, contact resistance monitoring system 400 may include one or more bridges 415 such that pins 406, pin receivers 411 and bridges 415 form a long contact chain. Long contact chains have a high probability of detecting a change in current resistance of an open or highly resistive contact based on a large sample size. As depicted in FIG. 4A, connector 410 may be formed with one or more 415 bridges between pin receivers 411, wherein each bridge 415 connects two pin receivers 411 such that contact resistance may be measured for a structure with a longer overall length than any contact point between pins 406 and pin receivers 411. By forming a long contact chain to increase the overall length of a structure being monitored by a single sensor 414, contact resistance monitoring system 400 may be able to detect smaller changes in contact resistance, allowing for earlier detection of a residue.

As depicted in FIG. 4A, in some embodiments, pin receivers 411 and/or connector 410 may be configured as a right-angle edge card connector 410 to minimize the footprint of contact resistance monitoring system 400. Configuring pin receivers 411 or connector 410 as a right-angle edge card connector may orient heating card 402 vertical in fluid 103L to facilitate more bubbles moving past a component 20 (and therefore more heat transfer and more mass transfer).

Alternative Structures

Alternatively, embodiments of a contact resistance monitoring system may be configured with a structure (not shown) comprising multiple terminals for detecting residue at a contact point between an existing component 20 and a connector on information handling system 100. A four-terminal structure, often referred to as a Kelvin structure, is an electrical impedance measuring structure that uses two pairs of electrodes (current and voltage) to measure contact resistance. A Kelvin structure may be configured to provide very high sensitivity to contact resistance changes. Kelvin structures are usually used to test one contact at a time but testing of multiple contacts may be performed with a multiplexer (MUX). A Kelvin structure, including a cross-bridge Kelvin structure, may be configured with a first pair of current-carrying electrodes and a second pair of voltage-carrying electrodes. As current passes through current-carrying electrodes, a voltage sensor may determine if a voltage drop occurs across the voltage-carrying electrodes. The sensor may communicate the voltage drop to a processor configured to analyze the voltage drop and determine a decrease in the current passing through the current-carrying electrodes. The decrease in current passing through the current-carrying electrodes may be associated with a residue present in fluid 103L.

Embodiments of contact resistance monitoring systems 300 and 400 may be integrated on an existing printed circuit board (PCB) in information handling system 100. In some embodiments, contact resistance monitoring systems 300 or 400 may be integrated on a PCIe card (not shown) having other functionality. Also, contact resistance monitoring systems 300 and 400 may be positioned near a graphics processing unit (GPU) or other high heat generating component 20 to maximize the likelihood that residues being distilled out of fluid 103 can be detected by contact resistance monitoring system 300 or 400.

In response to determining a residue or other contaminant is present in fluid 103, embodiments of contact resistance monitoring systems may communicate a signal to allow for corrective measures before the level of residue or corrosion damages a component 20 on information handling system 100 or interferes with operation of a component 20. Some embodiments may be configured to communicate a basic signal that indicates residue or corrosion is present. Some embodiments may be configured to communicate a signal that indicates a filter must be changed, that fluid 103 should be replaced, that a component 20 or information handling system 100 should be replaced or will need to be replaced soon, or some other corrective measure less than a total replacement of all information handling systems 100 in tank 102. A signal may include one or more measurements to allow a processor 20-1 to determine an amount of residue present in tank 102.

In some embodiments, a contact resistance measurement system may be integrated with a processor component 20-1 and the component 20-1 may execute instructions to determine if an oily residue is starting to compromise its contact resistance. In some embodiments (not shown), a contact resistance measurement system may integrate components 20 and operate as a system on a chip (SoC). A SoC may include a central processing unit (CPU) component 20-1, memory components 20-2, input/output ports 20-3 and other components 20 on a single substrate or microchip. A SoC may perform signal processing functions and may reduce power consumption needed to process instructions for measuring contact resistance or otherwise detecting the presence of residues in information handling systems 100.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A system for detecting residue in an immersion cooling system, the system comprising:
    a structure configured to represent a type of contact point in an information handling system installed in the immersion cooling system;
    a current source for applying a fixed current through the structure;
    a heat source proximate to the structure, the heat source configured to heat a two- phase fluid to a boiling point;
    a sensor for outputting a signal corresponding to a voltage drop across the structure; and
    a processor coupled to the sensor and configured to:
        receive the signal from the sensor;
        determine an increase in a contact resistance based on the signal indicating a decrease in the voltage drop across the structure; and
        communicate an indication that a residue in the two-phase fluid has exceeded a threshold level based on the increase in the contact resistance.

2. The system of claim 1, wherein the structure connects at least two pin receivers of the plurality of pin receivers to form a contact chain.

3. The system of claim 2, wherein a contact resistance associated with the contact chain is more sensitive to the change in current resistance than any pin of the first plurality of pins.

4. The system of claim 1, wherein the second plurality of pins is configured for coupling to a PCIe card.

5. The system of claim 1, wherein the structure is integrated with the connector or the component.

6. The system of claim 1, wherein the structure comprises a multiple terminal resistance structure.

7. The system of claim 6, wherein the structure comprises a Kelvin structure.

8. The system of claim 1, wherein the system is a stand-alone system comprising:
    a heating card comprising a first plurality of pins and a heating element, wherein the heating element is the heat source; and
    a sensor card for coupling to the heating card, the sensor card comprising:
        the sensor;
        a plurality of pin receivers for connecting to the first plurality of pins on the heating card, wherein the structure comprises a plurality of contact points between the first plurality of pins and the plurality of pin receivers; and
        a multiplexer coupled to the plurality of pin receivers and coupled to a second plurality of pins less than the first plurality of pins, wherein the second plurality of pins are configured for coupling to the connector in the information handling system.

9. A system for detecting residue in an immersion cooling system, the system comprising:
    a structure configured to represent a type of contact point in an information handling system installed in the immersion cooling system;
    a voltage source for applying a voltage across the structure;
    a heat source proximate to the structure, the heat source configured to heat a two-phase fluid to a boiling point;
    a sensor for outputting a signal corresponding to a current passing through the structure; and
    a processor coupled to the sensor and configured to:
        receive the signal from the sensor;
        determine an increase in a contact resistance based on the signal indicating a decrease in the current passing through the structure; and
        communicate an indication that a residue in the two-phase fluid has exceeded a threshold level based on the increase in the contact resistance.

10. The system of claim 9, wherein the structure connects at least two pin receivers of the plurality of pin receivers to form a contact chain.

11. The system of claim 10, wherein a contact resistance associated with the contact chain is more sensitive to the change in current resistance than any pin of the first plurality of pins.

12. The system of claim 9, wherein the second plurality of pins is configured for coupling to a PCIe card.

13. The system of claim 9, wherein the structure is integrated with the connector or the component.

14. The system of claim 9, wherein the structure comprises a multiple terminal resistance structure.

15. The system of claim 14, wherein the structure comprises a Kelvin structure.

16. The system of claim 9, wherein the system is a stand-alone system comprising:
    a heating card comprising a first plurality of pins and a heating element, wherein the heating element is the heat source; and
    a sensor card for coupling to the heating card, the sensor card comprising:
        the sensor;
        a plurality of pin receivers for connecting to the first plurality of pins on the heating card, wherein the structure comprises a plurality of contact points between the first plurality of pins and the plurality of pin receivers; and
        a multiplexer coupled to the plurality of pin receivers and coupled to a second plurality of pins less than the first plurality of pins, wherein the second plurality of pins are configured for coupling to the connector in the information handling system.

17. A two-phase immersion cooling system, comprising:
    a tank containing a two-phase fluid;
    a printed circuit board comprising a heat generating component installed in the tank; and
    a system for detecting residue in the two-phase fluid, comprising:
        a structure configured to represent a type of contact point between a component and a connector in an information handling system installed in the immersion cooling system;
        one of a current source for applying a current through the structure or a voltage source for applying a voltage to the structure;

a heat source proximate to the structure, the heat source configured to heat the two-phase fluid to a boiling point;
a sensor for outputting a signal corresponding to the current passing through the structure or a voltage drop across the structure; and
a processor coupled to the sensor and configured to:
  receive the signal from the sensor;
  determine an increase in a contact resistance based on the signal indicating a decrease in the current passing through the structure or a voltage drop across the structure; and
  communicate an indication that a residue in the two-phase fluid has exceeded a threshold level based on the increase in the contact resistance.

18. The two-phase immersion cooling system of claim 17, wherein:

the system for detecting residue in the two-phase fluid is a stand-alone system comprising:
  a heating card comprising a first plurality of pins and a heating element, wherein the heating element is the heat source; and
a sensor card for coupling to the heating card, the sensor card comprising:
  the sensor;
  a plurality of pin receivers for connecting to the first plurality of pins on the heating card to form a plurality of contact points; and
  a multiplexer coupled to the plurality of pin receivers and coupled to a second plurality of pins less than the first plurality of pins, wherein the second plurality of pins are configured for coupling to the connector in the information handling system.

* * * * *